UNITED STATES PATENT OFFICE.

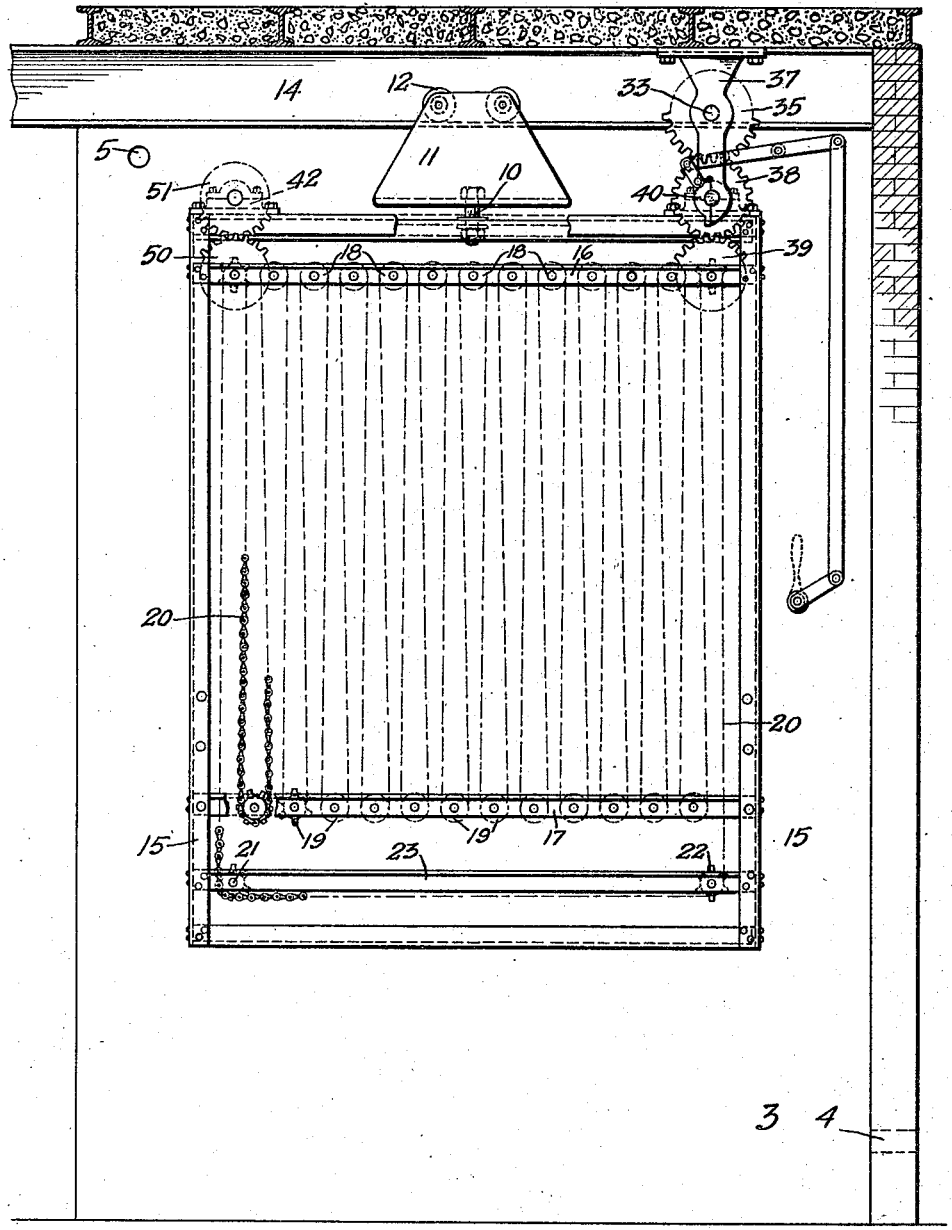

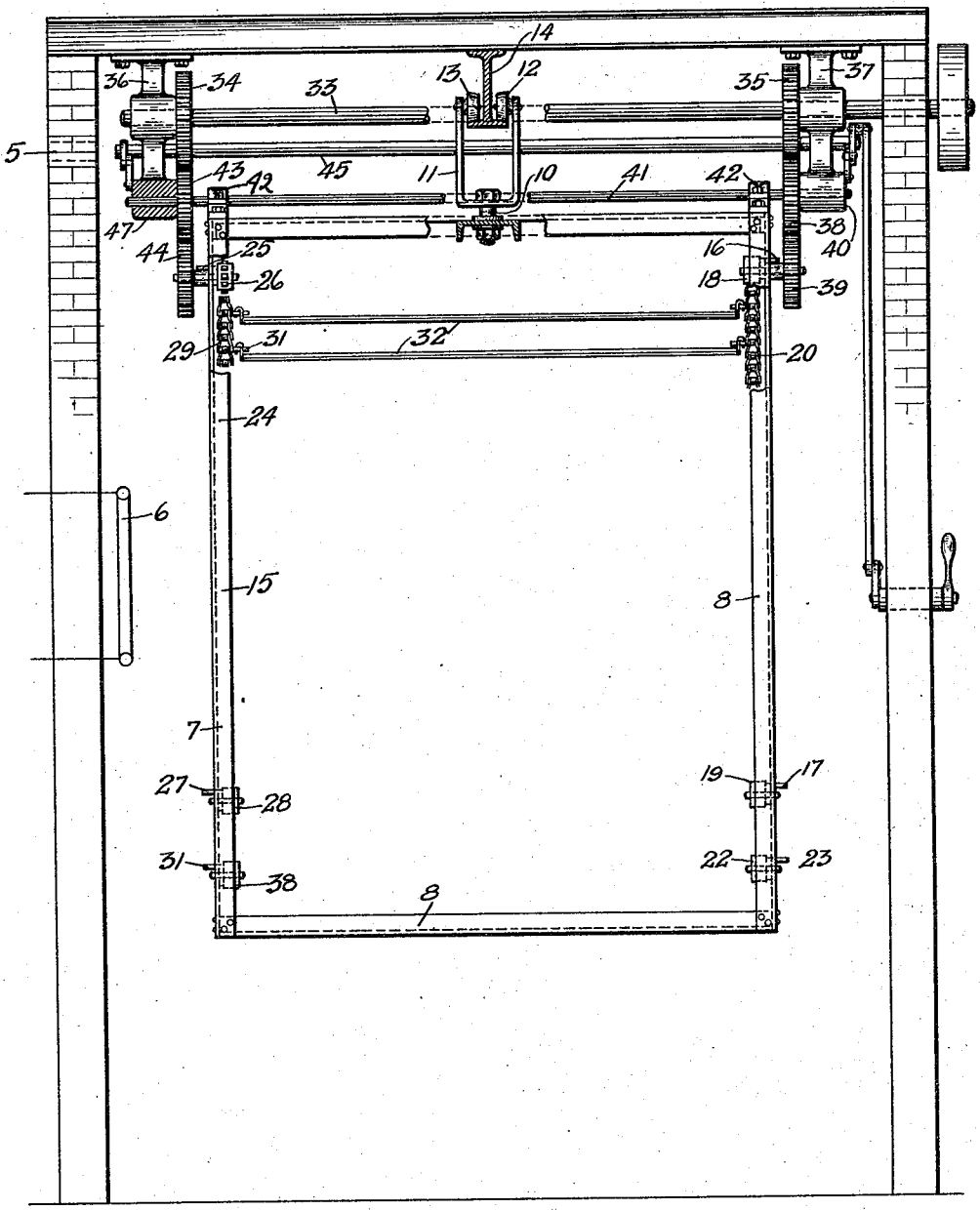

BERNARD APPEL, OF NEW YORK, N. Y.

SAUSAGE-TREATING MACHINE.

1,185,756.  Specification of Letters Patent.  Patented June 6, 1916.

Application filed November 6, 1915. Serial No. 59,926.

*To all whom it may concern:*

Be it known that I, BERNARD APPEL, a subject of the Emperor of Austria-Hungary, and resident of New York city, in the county of Bronx and State of New York, have invented certain new and useful Improvements in Sausage-Treating Machines, of which the following is a specification.

The present invention has reference to an apparatus for smoking or treating articles of food such as links of sausage.

The object of the present invention is to provide means for supporting a considerable number of sausage links or similar articles, which means can be loaded and then advanced into the oven or treating chamber, and readily removed from the same.

A further object is to provide means on the support whereby the sausages are continuously advanced throughout the space of the oven, for the purpose of causing them to be evenly subjected to the heating means in the oven.

A further object is to provide the supporting means for the carrier whereby it can be withdrawn from the oven and again advanced into the oven in a reversed position; and in both of which positions the mere entrance of the carrier into the oven to its proper position will bring it to position for engagement with the actuating means for operating on the sausages.

In the accompanying drawings illustrating one embodiment of my invention, Figure 1 is a section through the oven, showing the carrier in side elevation; and Fig. 2 is a front view of the apparatus with the front of the oven removed.

As shown in the drawings I provide a heating chamber or oven 3 of any desired character, that has one end, (not shown) removable in the form of a door to be entirely opened to admit the insertion and removal of the carrier. Any desired heating means may be provided in the oven for treating the articles. Where the articles are to be smoked or given a similar treatment, the proper gases may be admitted at a lower opening 4, and permitted to escape at an upper opening 5 on the opposite side, so that there will be a current of the gases throughout the oven. Or if preferred direct heating means may be provided in the oven at one or several places, such as an electric heater 6.

I provide a carrier denoted generally by 7 that is shown in the form of an open frame of rectangular shape, that may be composed of bars of iron 8 such as angle bars. At the top of the frame across the middle extends a supporting beam by which the carrier is suspended by a bolt 10, from a trolley 11 whereby the carrier has a swivel support and can be turned on this bolt as an axis. The trolley is provided with wheels 12 and 13 that run on a track formed by an I beam 14 secured at the top of the oven, and which projects beyond the oven at the door or front. By this means the carrier can be run into the oven, and removed therefrom. The swivel suspension of the carrier on the trolley permits the carrier to be withdrawn and turned a half revolution, and then returned to the oven.

On one side of the frame I secure to the side bars 15, cross bars 16 and 17 at the upper and lower portions. These cross bars carry sprockets 18 and 19 respectively symmetrically arranged, to support an endless chain 20. This chain is continued downward to engage sprockets 21 and 22 on a cross bar 23 carried by the side bars 15. On the opposite side of the frame the side bars 24 carry a cross bar 25 at the top provided with a series of sprockets 26; and also a cross bar 27 at the bottom that carry sprockets 28. Between these sprockets runs an endless chain 29, that passes around sprockets 30 at the lower portion on a cross bar 31, similar to the sprockets 21 and 22 on the opposite side. It is to be understood that these chains are symmetrically arranged on the opposite sides. These chains are provided with hooks or pins 31 adapted to engage cross rods 32 removably supported thereon. And these cross rods are adapted for engaging the links of sausage or other articles that will hang downwardly from the rods. By imparting a simultaneous advance to the chains, the rods 32 will move in the same path, that is will be alternately carried up and down through the interior of the frame or carrier, and thus the sausage links on the rods will be caused to travel upwardly and downwardly throughout the area of the oven. By this means it will be understood that the articles will be subjected to the different degrees of heat of the gases that enter and pass through the oven, and which will result in their uniform treatment thereby. Were the articles to remain stationary in the oven, those first engaged by the entering gases would be treated differently from those farther removed from the heated gases, and the proper results would not be obtained. But by thus causing the articles to move upwardly and downwardly and to pass across from one side to the other, a uniform result will be obtained in the treatment of the articles. The same applies where a heater is used at one or more places inside of the oven, as the articles are alternately brought in proximity to the heater, and moved away therefrom.

To accommodate different lengths of articles, I arrange a cross bar 17 whereby it can be shifted upwardly or downwardly and thus provide greater space between the lower sprockets and the horizontal portion of the chain at the lower part. The other cross bar 27 can be similarly adjusted, and of course must be shifted the same distance.

To provide means for simultaneously advancing the chains, in several positions of the carrier, I provide actuating means in the oven at the upper portion. A shaft 33 extends across the oven and is driven by any suitable means not shown, such as a motor thereon. This shaft carries gear wheels 34 and 35 adjacent its brackets 36 and 37. On the frame or carrier at one side is mounted a gear 38 that meshes with a gear 39 on the carrier connected by its spindle with the end sprocket 18, whereby the chain 20 will be driven through said gears. But the bearing for the gear 38 on the bracket 37, has a split portion 40 that is hinged to swing back and free the spindle 41 of the gear 38 from the bracket. This spindle 41 has fixed bearings 42 mounted in the carrier frame. On the opposite side is a similar construction for the gear 43 that meshes with gear 44 connected with the sprocket 26 on that side. The gear 43 is fast on the shaft 41 that is also supported in a hinged bearing 47 similar to the bearing 40. By this means the chain 29 will be driven simultaneously with the chain 20. It will be further seen that the carrier can be advanced into the oven with the hinged bearings 40 and 47 swung open, until the gear 38 will engage with the gear 35 and the gear 43 will mesh with the gear 34. In this position the spindles 41 and 45 will enter the bearings, and the hinged portions thereof can be closed down thereon.

It will be understood that at the opposite side of the frame is a symmetrically arranged construction identical with that just described, only one of which arrangements are shown in Fig. 1. The sprocket 18 on this side is secured to a gear 50 that engages a gear 51. Directly opposite the gears 50 and 51 are similar gears not shown. It will be understood that the gear 51 and the similar one on the opposite side, are arranged similar to the gears 43 and 38 on the opposite side, so that if the carrier is withdrawn from the oven, and turned a half revolution on its swivel support, the gear 50 and its mate will be in position when the carrier is returned, to directly engage the gears 34 and 35. The spindles for the gear 50 and its mate will engage the hinged bearings 47 and 40, in the same manner that those on the opposite side engage these bearings. It will therefore be understood that the carrier can be inserted in either of two positions, and will engage the actuating means in the oven to have the chains advanced.

Having thus described my invention, what I claim is:

1. In a sausage smoking apparatus, an oven adapted for treating the sausages, a carrier in the form of an open frame, a track at the top of the oven, a trolley slidable on said track and arranged to support the carrier to turn on a vertical axis, whereby the carrier can be moved into and out of the oven, symmetrically arranged sets of sprocket wheels on two opposite sides of the carrier, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

2. In a sausage smoking apparatus, an oven adapted for treating the sausages, a carrier in the form of an open frame, a track at the top of the oven, a trolley slidable on said track and arranged to support the carrier to turn on a vertical axis, whereby the carrier can be moved into and out of the oven, symmetrically arranged sets of sprocket wheels on two opposite sides of the carrier, said wheels on each side being arranged in a horizontal series at the upper and lower portions, with an additional pair below the lower series on each side, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed upwardly and downwardly throughout the area of the carrier in a continuous manner by the operation of the chains.

3. In a sausage smoking apparatus, an oven adapted for treating the sausages, a carrier in the form of an open frame, means at the top of the oven whereby the carrier can be moved into and out of the oven, symmetrically arranged sets of sprocket wheels on two opposite sides of the carrier, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

4. In a sausage smoking apparatus, an oven adapted for treating the sausages, a carrier in the form of an open frame, means at the top of the oven whereby the carrier can be moved into and out of the oven, symmetrically arranged sets of sprocket wheels on two opposite sides of the carrier, said wheels on each side being arranged in a horizontal series at the upper and lower portions, with an additional pair below the lower series on each side, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

5. In a sausage smoking apparatus, an oven adapted for treating the sausages, a carrier in the form of an open frame, a track at the top of the oven, a trolley slidable on said track and arranged to support the carrier to turn on a vertical axis, whereby the carrier can be moved into and out of the oven, symmetrically arranged sets of sprocket wheels on two opposite sides of the carrier, said wheels on each side being arranged in a series at the opposite portions, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

6. In a sausage smoking apparatus, an oven adapted for treating the sausages, a carrier in the form of an open frame, means whereby the carrier can be moved into and out of the oven, symmetrically arranged sets of sprocket wheels on two opposite sides of the carrier, said wheels on each side being arranged in a series at the opposite portions, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

7. In a sausage smoking apparatus, an oven adapted for treating the sausages, a carrier in the form of an open frame, means whereby the carrier can be moved into and out of the oven, symmetrically arranged sets of sprocket wheels on two opposite sides of the carrier, said wheels on each side being arranged in a series at the opposite portions, driving means in the oven engaging both chains to advance them in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

8. In a sausage smoking apparatus, an oven adapted for treating the sausages, a carrier in the form of an open frame, a track at the top of the oven, a trolley slidable on said track and arranged to support the carrier to turn on a vertical axis, whereby the carrier can be moved into and out of the oven, symmetrically arranged sets of sprocket wheels on two opposite sides of the carrier, said wheels on each side being arranged in a horizontal series at the upper and lower portions, with an additional pair below the lower series on each side, two endless chain members one mounted on each said set of wheels, driving means in the oven engaging both chains to advance them in unison, oppositely arranged supports on the chains, and a set of article-carrying rods removably engaged at their ends by said chain supports, said rods being adapted to receive the articles that are thereby conveyed upwardly and downwardly throughout the area of the carrier in a continuous manner by the operation of the chains.

9. In a sausage smoking apparatus, an oven adapted for treating the sausages, a carrier in the form of an open frame, a track at the top of the oven, a trolley slidable on said track and arranged to support the carrier to turn on a vertical axis, whereby the carrier can be moved into and out of the oven, symmetrically arranged sets of sprocket wheels on two opposite sides of the carrier, two endless chain members one mounted on each said set of wheels, driving means in the oven at opposite sides, means on the sprocket wheels on opposite sides at one end of the carrier for engagement with the said driving means respectively when the carrier is moved into the oven to cause advance of the chains in unison, means on the sprockets at the opposite side of the carrier whereby on insertion of the carrier in a reversed position the latter sprocket means will coöperate with the said driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

10. In a sausage smoking apparatus, an oven adapted for treating the sausages, a carrier in the form of an open frame, means at the top of the oven whereby the carrier can be moved into and out of the oven, symmetrically arranged sets of sprocket wheels on two opposite sides of the carrier, said wheels on each side being arranged in a horizontal series at the upper and lower portions, with an additional pair below the lower series on each side, two endless chain members one mounted on each said set of wheels, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains, the two sets of sprocket wheels at the lower portion of the carrier being connected with the carrier frame whereby they can be shifted to different positions to vary the lowermost position assumed by the articles.

11. In a sausage smoking apparatus, an oven adapted for treating the sausages, a carrier in the form of an open frame, means arranged to support the carrier whereby the carrier can be moved into and out of the oven, endless chain members, driving means to advance the chains in unison, oppositely arranged supports on the chains, and a set of article-carrying rods removably engaged at their ends by said chain supports, said rods being adapted to receive the articles that are thereby conveyed throughout the area of the carrier in a continuous manner by the operation of the chains.

12. In a sausage smoking apparatus, an oven adapted for treating the sausages, a carrier, means for supporting the carrier whereby it can be moved into and out of the oven, and conveying means on the carrier for receiving the articles and moving them throughout the interior of the carrier.

13. In a sausage smoking apparatus, an oven adapted for treating sausages, a carrier in the form of an open frame, means for supporting the carrier whereby it can be moved into and out of the oven, a conveyer on the carrier whereby the articles can be moved throughout the area of the oven, and means for actuating a conveyer that can be operated from the exterior of the oven.

14. In a sausage smoking apparatus, an oven, supporting means in the oven, a symmetrically arranged set of sprocket wheels on two opposite sides of the supporting means, said wheels on each side being arranged in a horizontal series at the upper and lower portions, with an additional pair below the lower series on each side, two endless chain members one mounted on each said set of wheels, driving means in the oven engaging both chains to advance them in unison, oppositely arranged supports on the chains, and a set of article-carrying members removably engaged at their ends by said chain supports, said members being conveyed upwardly and downwardly throughout the area of the carrier in a continuous manner by the operation of the chains.

BERNARD APPEL.

Copies of this patent may be obtained for five cents each, by addressing the "Commissioner of Patents, Washington, D. C."